United States Patent
Kerger et al.

(10) Patent No.: US 6,783,112 B2
(45) Date of Patent: Aug. 31, 2004

(54) TAP

(75) Inventors: Léon Kerger, Helmdange (LU); Jean-Claude Schmitz, Heisdorf (LU)

(73) Assignee: Torrent Trading Ltd., Tortola (VG)

( * ) Notice: Subject to any disclaimer, the term of this patent is extended or adjusted under 35 U.S.C. 154(b) by 38 days.

(21) Appl. No.: 10/247,949

(22) Filed: Sep. 20, 2002

(65) Prior Publication Data

US 2003/0047701 A1 Mar. 13, 2003

Related U.S. Application Data

(63) Continuation-in-part of application No. 09/770,903, filed on Jan. 26, 2001, now abandoned.

(30) Foreign Application Priority Data

Feb. 10, 2000 (LU) .................................................. 90520

(51) Int. Cl.[7] ................................................. F16K 1/50
(52) U.S. Cl. ...................................................... 251/285
(58) Field of Search ................................. 251/284, 285, 251/286, 287, 288

(56) References Cited

U.S. PATENT DOCUMENTS

| | | | |
|---|---|---|---|
| 135,981 A | 2/1873 | Fogarty | |
| 891,672 A | 6/1908 | Crane | |
| 1,137,343 A | * 4/1915 | McGivern | 251/284 X |
| 1,331,025 A | 2/1920 | Riggin | |
| 1,532,251 A | 4/1925 | Lorraine | |
| 1,746,055 A | * 2/1930 | Roberts et al. | 251/285 X |
| 1,832,725 A | 11/1931 | Mueller | |
| 2,001,035 A | 5/1935 | Noll | |
| 2,497,635 A | * 2/1950 | Stevens | 251/285 X |
| 2,761,647 A | * 9/1956 | Zeck | 251/285 X |
| 3,066,908 A | 12/1962 | Floren et al. | |
| 3,107,546 A | 10/1963 | Rowland | |
| 3,254,872 A | 6/1966 | Roos | |
| 4,776,565 A | 10/1988 | Sheen | |
| 4,809,949 A | 3/1989 | Rakieski | |
| 4,927,116 A | 5/1990 | Schwarz et al. | |

* cited by examiner

Primary Examiner—David A. Scherbel
Assistant Examiner—Eric Keasel
(74) Attorney, Agent, or Firm—Leydig, Voit & Mayer, Ltd.

(57) ABSTRACT

The tap intended for controlling the flow of a fluid, for example of a gas, comprises a tap body (34), an inner member (36) for opening and closing the passage of the gases, an outer rotary operating handwheel (42), a connector member (40) connecting the operating handwheel (42) to the closing member (36) and a stop mechanism limiting the movement of the operating handwheel (42) and of the opening and closing member (36) in the opening direction of the tap. In order to avoid the tap becoming jammed in the open position, the stop mechanism that limits the movement of the operating member comprises of an abutment (44) and a counterabutment (46) with frontal contact, which are arranged respectively on a rotary element and on the body (34) of the tap, or vice versa.

4 Claims, 3 Drawing Sheets

TAP

CROSS-REFERENCE TO RELATED PATENT APPLICATIONS

This patent application is a continuation-in-part of U.S. patent application Ser. No. 09/770,903, filed Jan. 26, 2001, now abandoned, which is based on Luxembourg Patent Application No. 90520, filed Feb. 10, 2000.

FIELD OF THE INVENTION

The present invention relates to a tap for controlling the flow of a fluid, comprising a tap body, an inner member for opening and closing the passage of the fluid, an outer rotary operating member, a connection means connecting the operating member to the closing member and means limiting the movement of the operating member and of the opening and closing member in the opening direction of the tap.

BACKGROUND OF THE INVENTION

Although not being limited to this, the invention relates, more particularly, to a tap for bottles or tanks containing compressed or liquefied gas. In this type of tap, the connection means may be a rod and the means for limiting the movement in the opening direction generally consist of one or two spindles passing through the body of the tap in the transverse direction perpendicularly to the movement of the rod and tangentially relative to the latter. For this purpose, the rod comprises, in its central region, an annular contraction allowing the passage of the two spindles and the rotation of the rod. These two spindles and the base of the contraction form abutments and counterabutments defining the end of travel of the rod and the stopping of the opening movement of the tap.

The disadvantage of this known system is that, at the end of movement and since the tap is generally opened fully, the two spindles approach the bottom of the contraction of the rod tangentially on account of the rotation of the rod. Consequently, contact between the rod and the spindle or spindles is frictional or rubbing contact, that is to say progressive clamping and even jamming of the tap in the opening position occurs.

This clamping or jamming of the tap requires a great amount of manual force when the tap is to be closed and prompts the use of a tool, such as pliers. This may, however, give rise to carelessness and has already caused accidents on opening the tap. To be precise, it has already happened that an operator, wanting to release the tap by means of a tool, has turned the operating member in the wrong direction, that is to say in the opening direction, until the head of the tap has fractured. This may obviously present a serious risk if the gases are toxic or explosive.

BRIEF SUMMARY OF THE INVENTION

The object of the present invention is to provide a novel tap of the type described in the introduction, which does not have this disadvantage, that is to say a tap without the risk of clamping or jamming when the tap is opened fully.

In order to achieve this object, the invention proposes a tap of the type described in the introduction, which is characterized in that said means limiting the movement of the operating member consist of an abutment and a counterabutment with frontal contact, which are arranged respectively on a rotary element and on the body of the tap, or vice versa.

Since there is no frictional contact between the abutment and counterabutment, there is no risk that the tap will become clamped or jammed. The operator can easily close the tap without exerting excessive force and without risking making a mistake over the direction of rotation and tightening the tap even more.

During opening and at the penultimate turn in the rotation of the operating member, the abutment and counterabutment do not yet come into contact, which means that, when they stop the rotation of the operating member, they are in mutual contact over a height which is smaller than the pitch of the threads between the rotary elements and the body of the tap.

BRIEF DESCRIPTION OF THE DRAWINGS

Other particular features and characteristics of the invention may be gathered from the detailed description of an embodiment given below by way of illustration, with reference to the accompanying drawings in which.

DETAILED DESCRIPTION OF THE INVENTION

Figure 1:
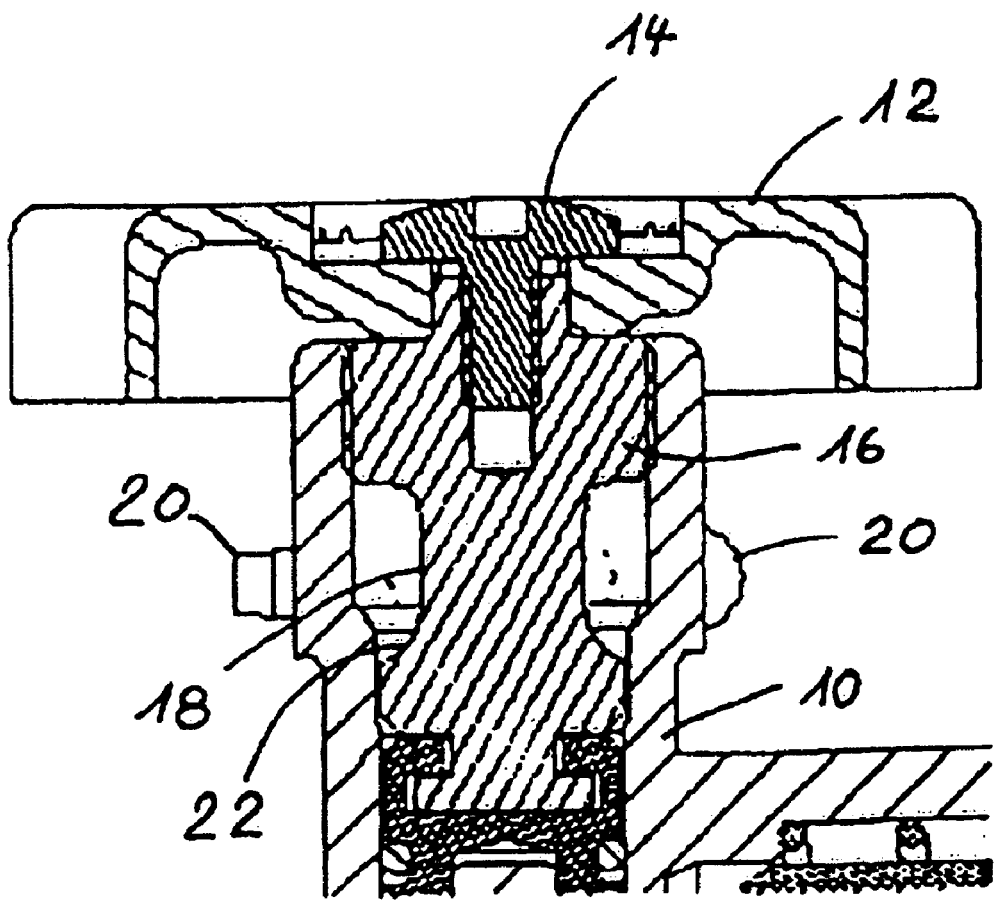
FIG. 1 is a vertical section through a known tap.

The known tap in FIG. 1, of which only the elements necessary for understanding the problem have been illustrated, comprises a tap body 10, preferably made of metal, for example bronze. The tap is actuated by means of an operating handwheel 12 which is fastened with the aid of a central screw 14 to a rod 16 screwed into the upper part of the body 10. On the opposite side to the handwheel 12, the rod 16 is connected directly or indirectly to the closing member, not shown, of the tap. Rotation of the member 12 consequently generates an axial movement of the rod 16 and of the closing member.

As shown in FIG. 1, the rod 16 comprises, in its middle region, an annular contraction 18 of a diameter smaller than that of the head of the rod 16. Moreover, one or preferably two spindles 20 are fastened transversely in the wall of the body 10 of the tap and pass through this contraction 18. These spindles 20 prevent the rod 16 from being unscrewed completely and form a stop abutment during the opening of the tap as a result of contact between the bottom 22 of the contraction and the spindles 20. For this purpose, the bottom 22 is rounded according to the curvature of the spindles 20.

However, as explained in the introduction, when the tap is opened, the bottom 22 of the contraction does not come into abutment on the spindles, but, because of the rotation of the rod, tangential frictional or shearing contact occurs between the rod 16 and the spindles 20, and this may give rise to excessive clamping or jamming of the tap in the opening position.

Figure 2:
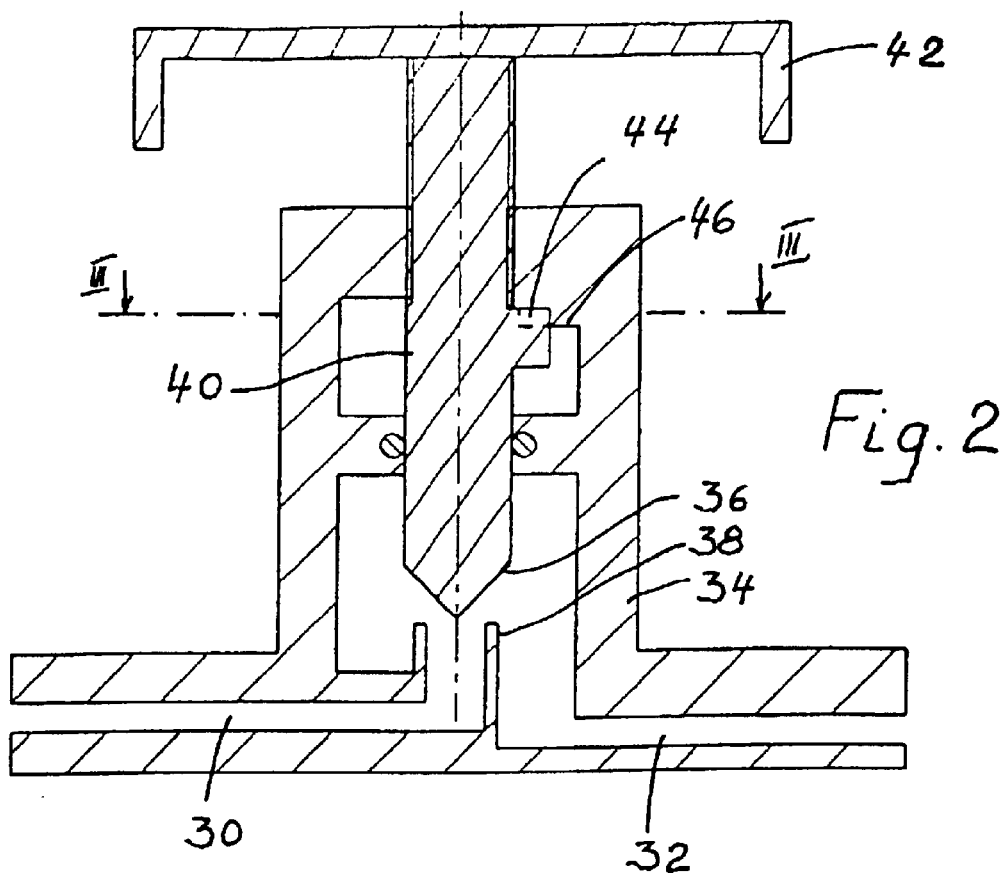
FIG. 2 is a vertical section through a tap according to the present invention.
Figure 3:
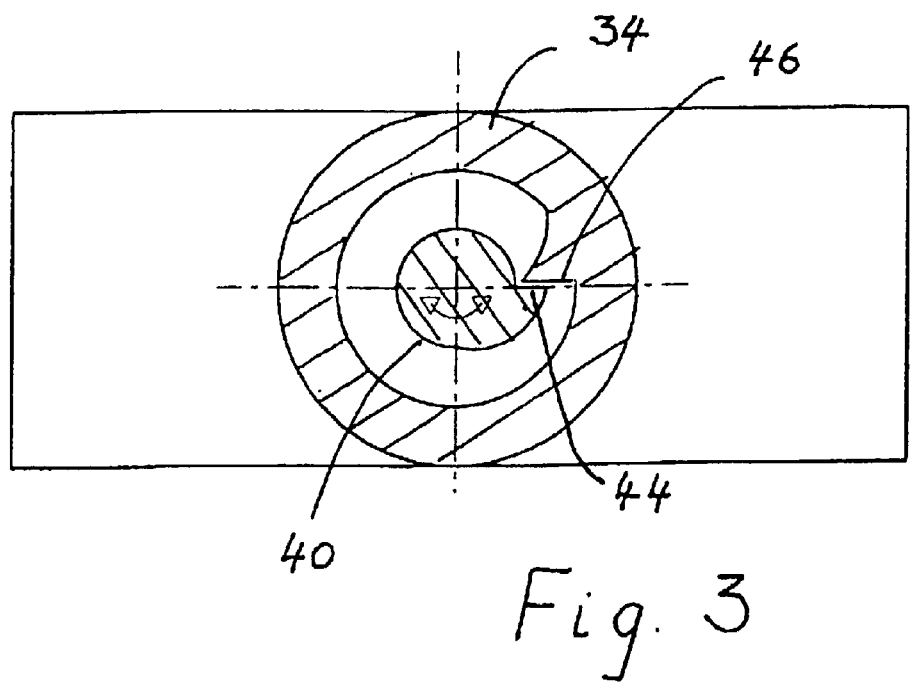
FIG. 3 is a horizontal section through the tap of FIG. 2 along the sectional plane III—III.

To overcome this disadvantage, the invention has proposed a novel tap, one embodiment of which is illustrated by way of example in FIGS. 2 and 3. This tap is intended for opening and closing communication between two pipes 30 and 32. The tap comprises a body 34, in which is located an opening and closing member 36 co-operating with a seat 38. The closing member 36 forms the lower part of a connecting rod 40 which is arranged axially in the body 34 and which is integral with an operating handwheel 42 outside the tap. The upper part of the connecting rod 40 is provided with an external thread co-operating with a corresponding thread in the head of the body 34, with the result that a rotation of the handwheel 42 causes the rod 40 to rise or fall, depending on the direction of rotation.

According to the present invention, the connecting rod comprises an outer radial abutment 44, whilst the body 34 comprises an inner radial counterabutment 46. The abutment 44 and the counterabutment 46 are arranged in such a way that, during the rotation of the connecting rod 40, the abutment 44 passes below the counterabutment 46 at the penultimate turn in the rotation of the handwheel 42 in the opening direction. By contrast, at the end of the last rotational turn and after the rise over a height corresponding to the pitch of the thread of the upper part of the connecting rod 40, the abutment 44 butts on the counterabutment 46, as illustrated in FIG. 2. The abutment 44 consequently strikes the counterabutment 46 perpendicularly without any friction and without the risk of clamping or jamming.

The location of the abutment 44 and of the counterabutment 46 is only one example of implementation. The abutment 44 could, for example, be provided on the inner face of a peripheral skirt of the handwheel 42 and the counterabutment could be provided on the outer surface of the body 34.

The abutment 44 and the counterabutment 46, instead of forming an integral part of the rod 40 and of the body 34 respectively, this part being obtained, for example, by machining, could be formed by pins made integral with these components.

Moreover, the rod 40 could be smooth over its entire height, and its axial movement could be generated by means of a thread provided on the inner face of a cylindrical skirt integral with the handwheel 42 and co-operating with a corresponding thread outside the body 34.

Finally, the handwheel could be replaced by a polygonal head which would be actuated by means of a special spanner.

For a valve as described hereinabove to operate reliably it is desirable for the abutment and the counterabutment to contact over a large part of the mutual surfaces that is to say over most of their axial length. If, for example, the abutment and the counterabutment are, the penultimate time the abutment passes the counterabutment, still separated by an axial distance which is barely smaller than the pitch of the screw which axially moves the moving abutment, then the two abutments will come into mutual contact only via their respective axial edges in order to stop the turning. Now, this may, in the long-term, lead to wear on their contacting edge and finally culminate in frictional contact, placing the valve back in the problematical situation described above.

This risk is therefore dependent on parameters which are of deciding importance to the area of contact between the abutment and the counterabutment. These are, in this instance, the pitch of the screw which axially moves the moving abutment, the respective angular positions of the moving abutment and of the counterabutment, and the manner of assembly.

For this risk not to exist, it is necessary for the arrangement to be such that the penultimate time the abutment passes the counterabutment, the axial distance between these two abutments is minimal, just enough to allow them to pass one another without contacting.

Figure 4:
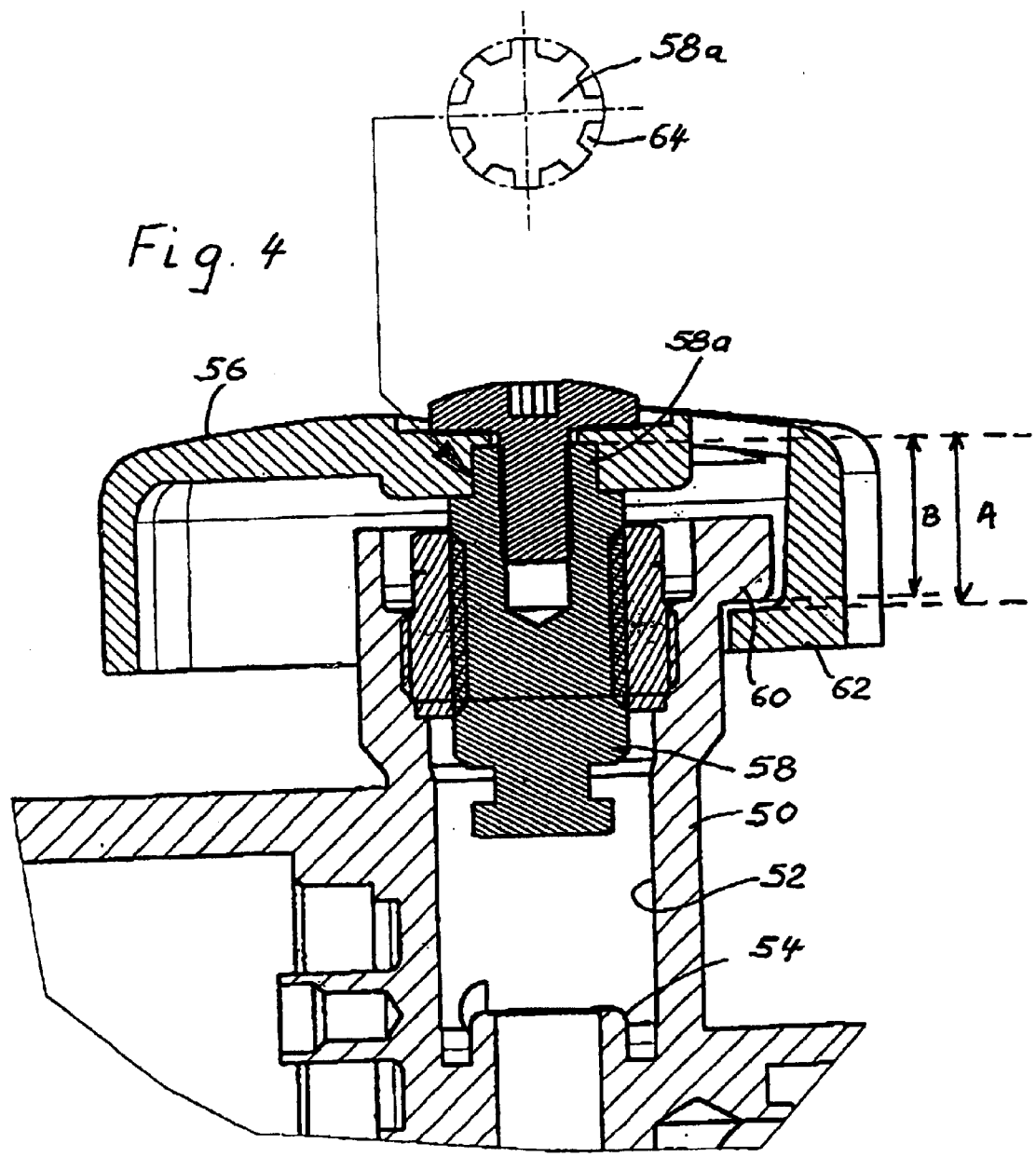
FIG. 4 shows a sectional view of a second embodiment of a valve during the opening phase corresponding to the penultimate turn of the operating handwheel.

FIG. 4 shows an embodiment of a valve which comprises means allowing the operating handwheel to be mounted in such a way that this condition is met. This embodiment employs the possibility of positioning the abutment and the counterabutment on the body of the valve and on the operating handwheel as mentioned hereinabove.

The valve comprises a valve body 50, preferably made of metal, for example made of bronze and through which there passes axially a cylindrical bore 52 in which there is a seat 54 at the intersection between an inlet connector and an outlet connector for fluid, for example gas.

The valve is operated by an operating handwheel 56 which is fixed, for example using a screw or any other means, to a connecting rod 58 which is screwed into the upper part of the body 50 or of an intermediate bushing. At the opposite edge to the handwheel 56, the rod 58 is connected directly or indirectly to an opening or shut-off member, not shown, which collaborates with the seat 54 to uncover or shut off the passage for the gas. The opening and shut-off member could also constitute the lower part of the rod although it is preferable to have a separate opening and shut-off member which does not turn with the connecting rod 58.

Turning the operating handwheel 56 therefore causes axial translation of the rod 58 and of the opening and shut-off member in the bore 52 of the body 50 of the valve.

The body of the valve comprises on its upper edge, a counterabutment 60 which extends radially outwards and is intended to halt an abutment 62 which extends radially inwards from the base of the handwheel 56.

The medallion above the figure shows a cross section through the upper end 58a of the connecting rod 58 which is intended to take the operating handwheel. This part 58a is splined around its entire periphery with a series of vertical splines 64 which extend over the entire penetration height of the operating handwheel 56. The bore in the handwheel which penetrates the head 58a of the rod has corresponding splines. These splines, as the handwheel 56 is fitted onto the head 58a of the rod 58 and prior to screw-fastening, allow the optimum angular position to be chosen for the handwheel which corresponds to maximum contact between the counterabutment 60 and the abutment 62 at the end of opening.

In practice, mounting is performed as follows, in the knowledge that, as shown in the figure, the distance A is the distance between the upper edge of the abutment 62 and the base of the centre of the handwheel which rests on the head 58a of the rod and the distance B is the distance between the lower edge of the counter-abutment 60 and the upper edge of the head 58a of the rod 58. If the distance A is fixed, the distance B varies according to the position of the rod 58 and of the handwheel. Before fitting the operating handwheel 56, the rod 58 is turned in the opening direction which causes the rod 58 to emerge from the body 50 and increases the distance B. This turning is continued until the difference between the distance A and the distance B is minimal, for example a fraction of mm. The handwheel 56 is then fitted on to the head at the splines 64, taking care that the handwheel lies in an angular position in which the abutment 62 is as close as possible to the counterabutment 60. In fact the counterabutment 60 and the abutment 62 cannot lie in the same angular position otherwise they would impede the fitting of the handwheel 56. It is then possible to fix the handwheel 56 by tightening its fixing screw. In other words, the handwheel 56 is mounted in a valve-open position which corresponds to the penultimate turn of the handwheel for opening. In effect, given the small distance between the upper edge of the abutment 62 and the lower edge of the counterabutment 60, if the handwheel is turned through one additional turn, the abutment 62 can no longer pass the counterabutment 60 and there will be frontal contact between these abutments over a relatively large area.

While the assembly has been described hereinabove in "slow motion" it is obvious that, in practice, assembly is performed automatically and in a programmed way under the control of sensors.

While the embodiment of FIG. 4 has been described with reference to external abutments, the person skilled in the art will be able to conceive a similar solution using internal abutments, as in the embodiment of FIGS. 2 and 3.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. Tap for controlling the flow of a fluid, comprising a tap body and a rotary element, the rotary element comprising an inner closing member for opening and closing the passage of the fluid, an outer rotary operating member, and a connection means connecting the operating member to the closing member, further comprising means limiting the movement of the operating member and of the closing member in the opening direction of the tap, characterized in that said means limiting the movement of the operating member comprises an abutment and a counterabutment with frontal contact, which are arranged respectively on the rotary element and on the body of the tap, wherein rotation of the operating member linearly translates the closing member to open and close the passage of fluid, the rotary element being rotated through multiple rotational turns to linearly translate the closing member, each rotational turn being of 360°, and wherein the frontal contact between the abutment and counterabutment occur during a last turn of said multiple rotational turns and not during turns preceding said last turn, and wherein the abutment is movable among a plurality of angular positions relative to the closing member during assembly of the tap, the abutment being set in one of the plurality of angular positions to control the front contact between the abutment and the counterabutment.

2. Tap according to claim 1, wherein the abutment is positioned on the outer rotary operating member.

3. Tap according to claim 2 wherein the outer rotary operating member is mounted to the connection means via splines.

4. Tap according to claim 3 wherein said splines provide means for adjusting the angular position between the abutment and the closing member.

* * * * *